Figure 3:
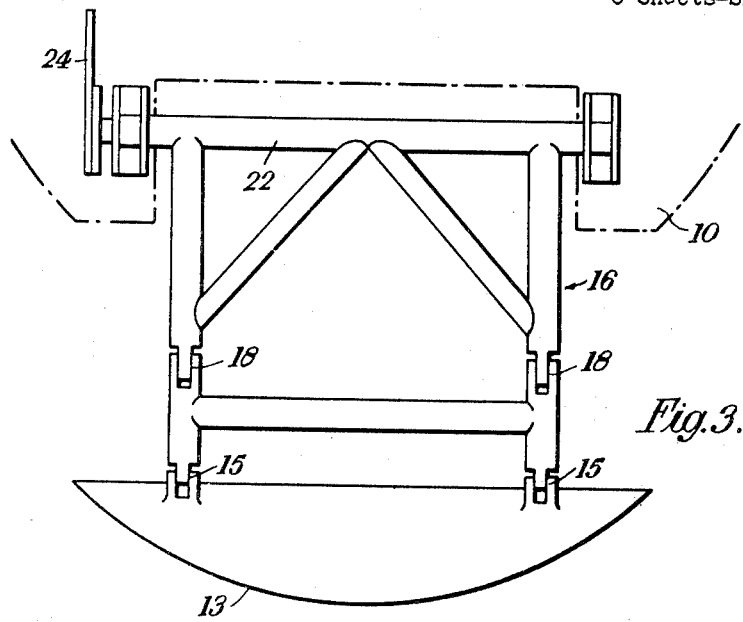

July 3, 1956
A. GOUGE
2,753,135
RETRACTABLE FLOATS FOR AIRCRAFT
Filed Dec. 13, 1951
6 Sheets-Sheet 1
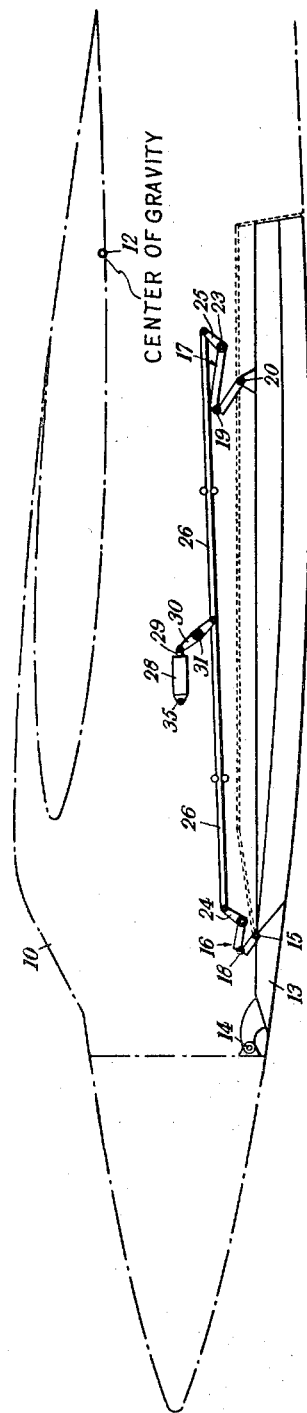
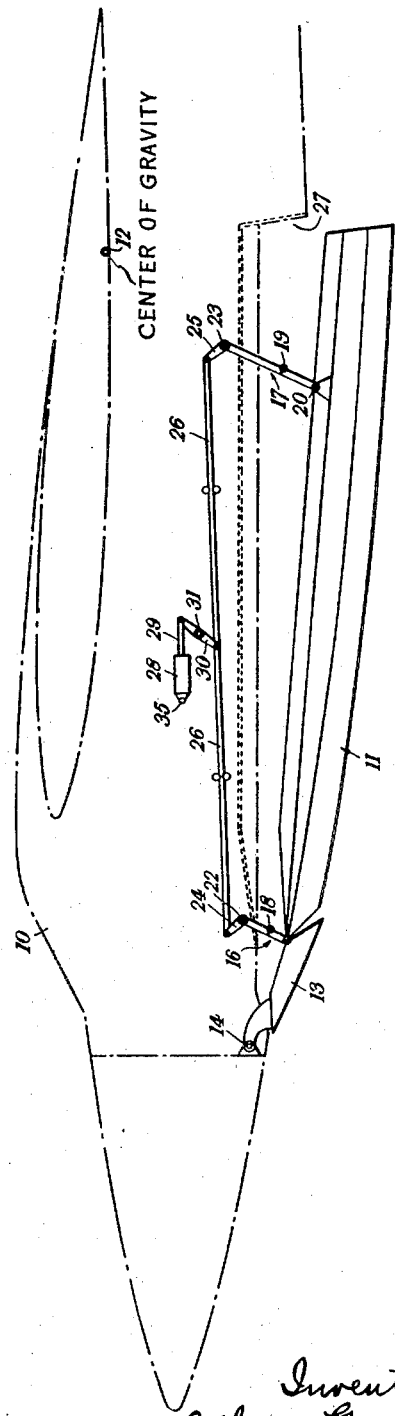
Inventor
Arthur Gouge
By Moses, Nolte, Crews & Berry
Attorneys July 3, 1956

A. GOUGE 2,753,135

RETRACTABLE FLOATS FOR AIRCRAFT

Filed Dec. 13, 1951

6 Sheets-Sheet 2

Inventor
Arthur Gouge
By Moses, Nolte, Crews + Berry
Attorneys

July 3, 1956 A. GOUGE 2,753,135
RETRACTABLE FLOATS FOR AIRCRAFT
Filed Dec. 13, 1951 6 Sheets-Sheet 3

Inventor
Arthur Gouge
By Moses, Nolte, Crews & Berry
Attorneys

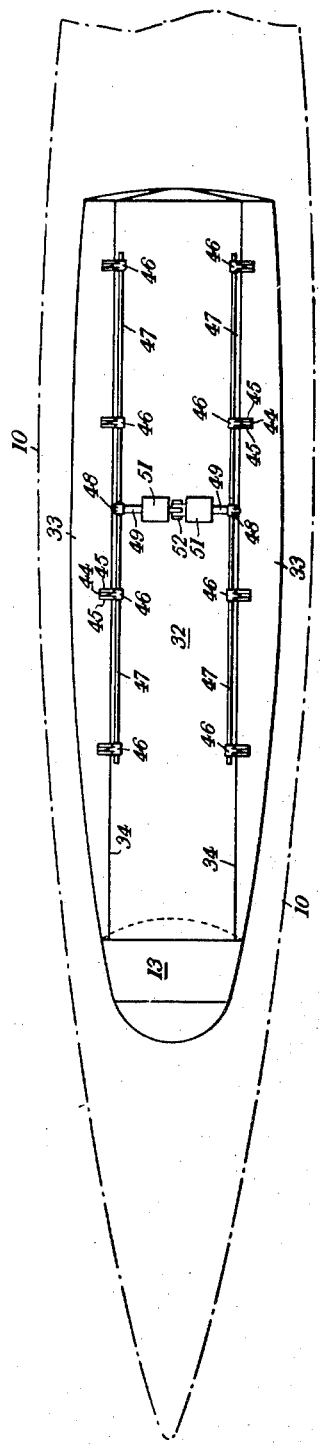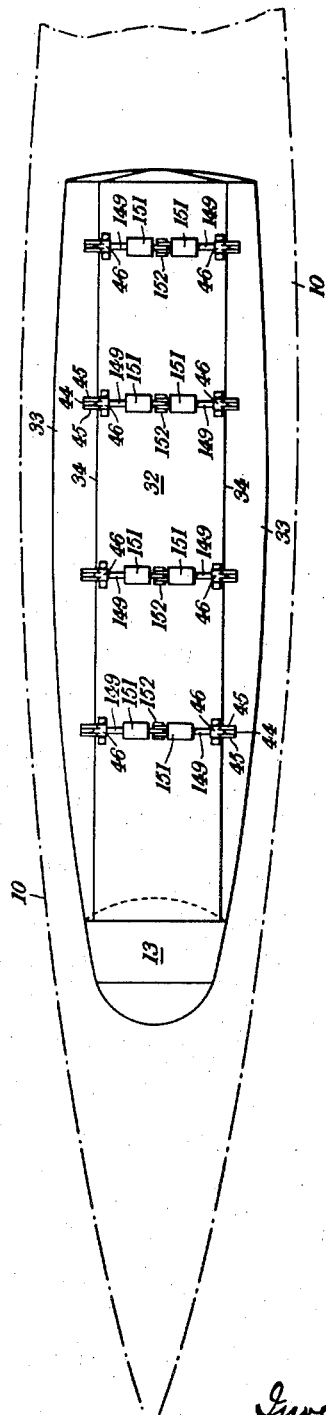

United States Patent Office 2,753,135
Patented July 3, 1956

2,753,135

RETRACTABLE FLOATS FOR AIRCRAFT

Arthur Gouge, East Cowes, Isle of Wight, England, assignor to Saunders-Roe Limited, Osborne, East Cowes, Isle of Wight, England, a British company Application December 13, 1951, Serial No. 261,416

Claims priority, application Great Britain December 13, 1950

3 Claims. (Cl. 244—106)

It is known to provide undercarriageless aircraft which can be launched by a catapult from an aircraft carrier and which can land on an inflated rubber mattress on the deck of the carrier. Such aircraft have not, however, hitherto been able to land on or take off from the water.

The invention provides an aircraft having a fuselage of substantially streamline shape and including a planing section which can be moved at will from a retracted position to a planing position in which it projects below the fuselage, the planing section comprising three separate watertight portions hinged together on fore and aft axes at the top of the section, the centre portion being of approximately V section as seen in front elevation and the outer portions being folded against the sides of the centre portion when the planing section is retracted, and means for moving the outer portions of the planing section outwardly about the hinges to set them at a desired angle in relation to the centre portion.

With such an aircraft, the planing section can be projected to act as a ski to enable the aircraft to land on or take off from the water, and retracted during flight. Moreover, the outer portions of the projected planing section can be adjusted in relation to the centre part to the best positions, i. e. to a position giving minimum impact loads for landing and to a position for take off such that spray is thrown out low and sideways by the planing section. Thus, for landing, the outer portions of the planing section may be moved angularly to positions such that their undersurfaces constitute upward continuations of the sides of the centre portion while, for take off, they may be adjusted to a position in which their undersurfaces are horizontal or such that their tips are below the level of the upper surface of the planing section.

I prefer to arrange that, in the projected position of the planing section, its aft end is lower than its forward end. This reduces to a minimum the tendency for water to rise over the top of the planing surface and so cause the aircraft to dive. In order to inhibit entirely this tendency, the forward end of the planing section may be pivoted to the aft end of a nose piece which, in turn, is pivoted at its forward end to the fuselage, the nose piece moving with the planing section from projected to retracted position and vice versa. The nose piece may, if desired, be split in the same way as the planing section, its outer portions being hinged to its centre portion.

Figure 4:
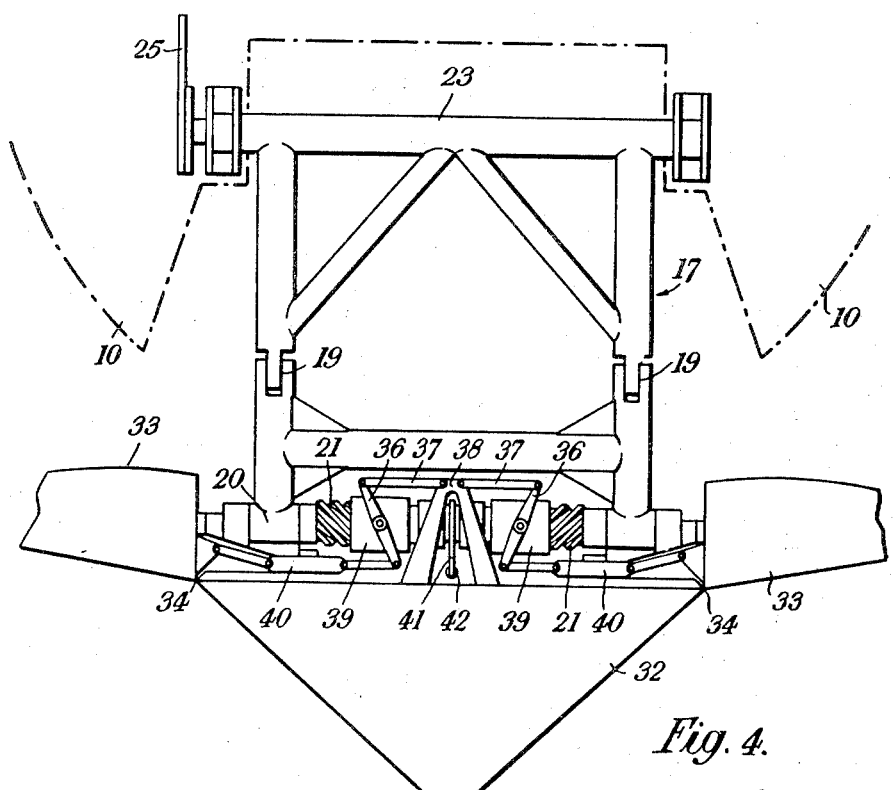
Figure 5:
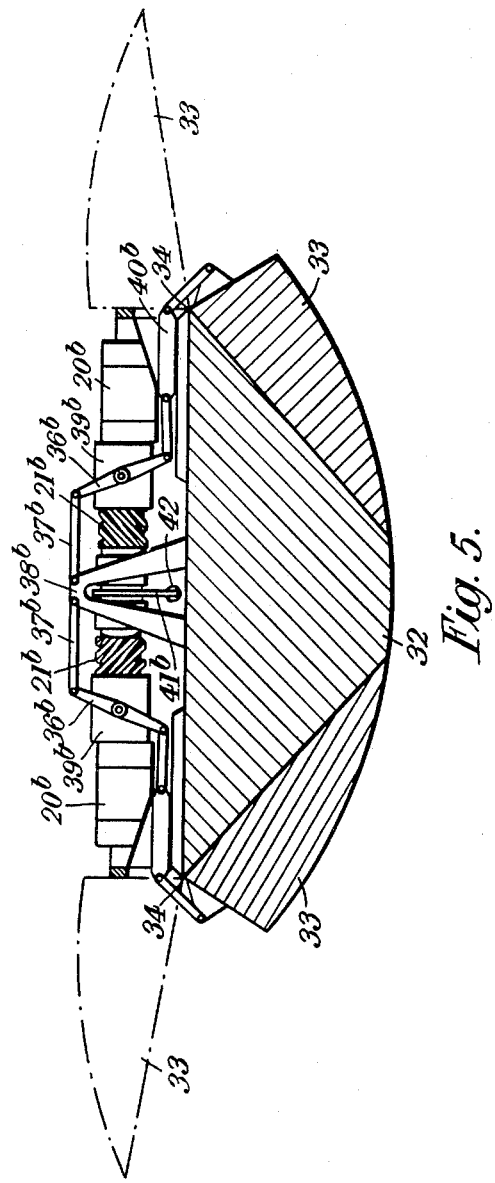
Figure 6:
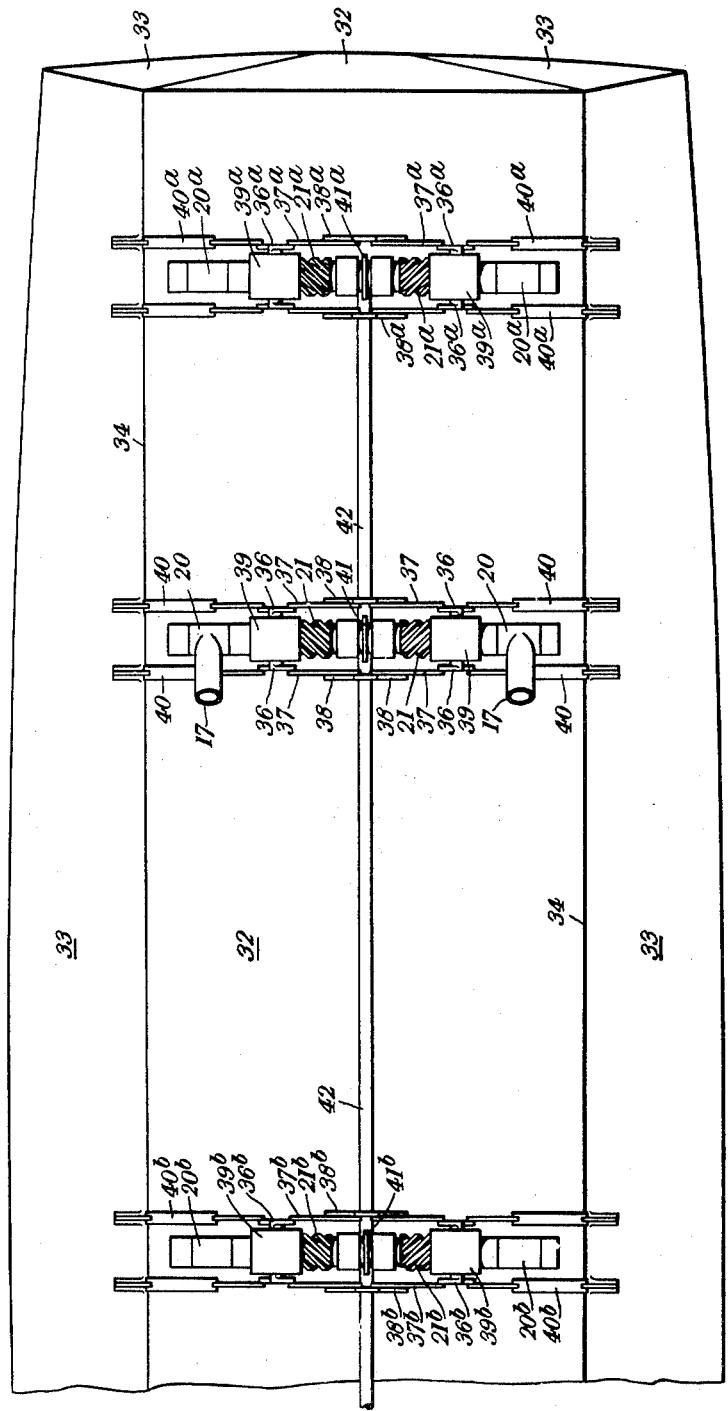
Figure 7:
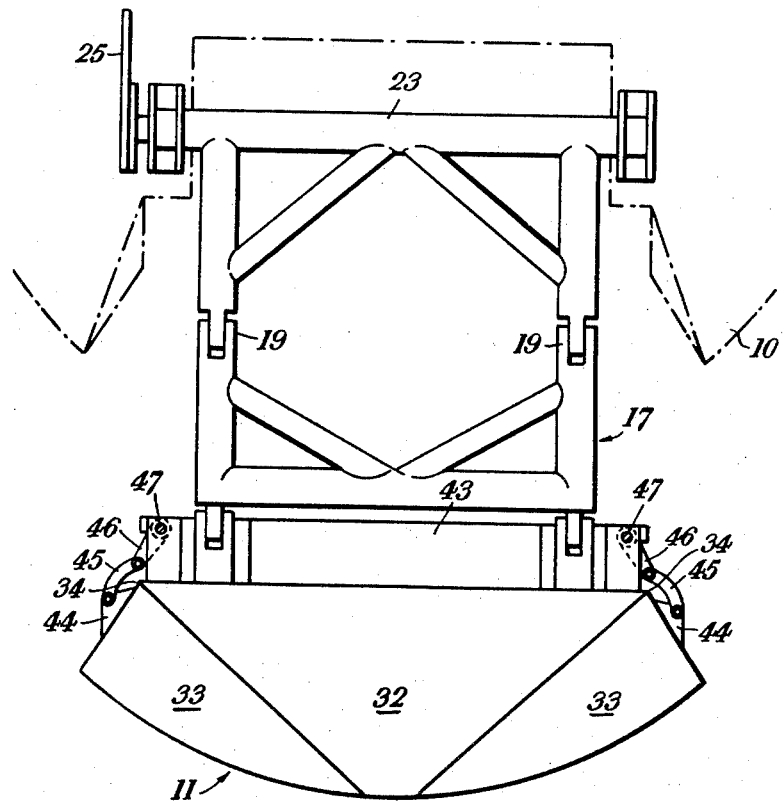
Figure 8:
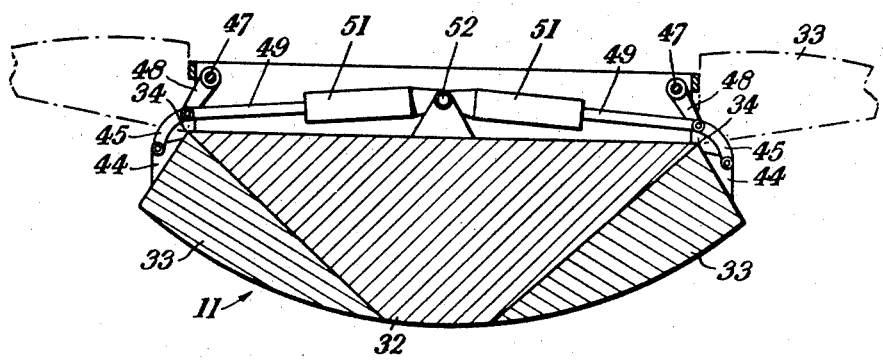

Certain embodiments of the invention will now be described in detail, by way of example, with reference to the accompanying diagrammatic drawings in which:

Fig. 1 is a side elevation of part of an aircraft according to the invention showing the planing section or ski retracted, Fig. 2 is a similar view, but showing the ski projected, Fig. 3 is an enlarged front elevation of the front strut of the ski, showing the ski projected, Fig. 4 is a similar view to Fig. 3, but showing the rear strut, also with the ski projected, Fig. 5 is a transverse section through the ski in the retracted position, Fig. 6 is a plan view of part of the ski in the retracted position, Figs. 7 and 8 are views corresponding respectively to Figs. 4 and 5, showing an alternative construction, Fig. 9 is a corresponding plan view, and Fig. 10 is a plan view, similar to Fig. 9, but showing a third alternative.

Like reference characters indicate like parts throughout the figures.

As will be seen from Figs. 1 and 2, the fuselage 10 of the aircraft is of substantially streamline shape. In place of the usual undercarriage, the fuselage is provided with a ski 11 located in a recess 27 in the fuselage, the aft end of which is below and slightly aft of the centre of gravity 12 of the aircraft. The ski is movable from the retracted position shown in Fig. 1, in which its undersurface is flush with the undersurface of the fuselage, to a projected position shown in Fig. 2 in which it is set at a coarse angle of incidence to the fuselage. Immediately forward of the ski is a nose piece 13, hinged at its forward end 14 to the fuselage and at its aft end 15 to the ski. The ski 11 is supported from the fuselage by forward and aft struts 16, 17 respectively. Each of these struts, which are shown in more detail in Figs. 3 and 4, is constituted by a framework. The side members of the forward strut are split to form a hinge 18, and this strut is pivoted at its lower end to the hinge 15. The side members of the rear strut 17 are split to form a hinge 19 and are attached at their lower ends to a torque shaft 20 having threaded portions 21 (Fig. 4).

The upper ends of the front and rear struts 16, 17 are attached respectively to torque shafts 22, 23, to which are fixed levers 24, 25 pivoted to control rods 26. A remotely operable jack 28, pivoted at 35 to the fuselage, has its actuating rod 29 coupled to an actuating lever 30, pivoted to the fuselage at 31, and the lever 30 serves on operation of the jack to actuate the control rods 26 to move the ski 11 and nose piece 13 from the retracted position of Fig. 1 to the projected position of Fig. 2 and vice versa. When the ski 11 is in the projected or planing position shown in Fig. 2, the nose piece 13 extends downwardly from the fuselage to the forward end of the ski, at shown, and serves to prevent water from running on to the upper surface of the ski.

The ski 11 (see Figs. 4 and 5) comprises a centre portion 32, of approximately V section as seen in front elevation, and two outer portions 33 which are hinged to the centre portion 32 for movement about spaced fore and aft axes 34. When the ski 11 is retracted, the outer portions 33 lie flat against the sides of the inner portion as shown in Fig. 5. As the ski moves to projected position, however, the outer portions 33 are automatically caused to move outwardly and upwardly into the positions shown in Fig. 4. This is effected as follows:

Coupled by levers 36 and links 37 to a bracket 38 on the centre portion 32 of the ski are nuts 39 which engage the oppositely screw threaded portions 21 on the torque shaft 20. As will be clear from Figs. 1 and 2, the torque shaft 20 rotates relatively to the ski as the latter moves down into the projected position. The nuts 39 are consequently caused to travel inwardly on the torque shaft 20 from the position shown in Fig. 5 to that of Fig. 4. The levers 36 are therefore rocked to draw inwardly linkages 40 connecting said levers to the outer sections 33 of the ski.

A lever 41 on the torque shaft 20 is pivoted to a rod 42 (Fig. 6) extending along the top of the centre portion 32 of the ski. Parallel to the torque shaft 20 are three other torque shafts, two only of which, 20$^a$ and 20$^b$, are shown in Fig. 6. These torque shafts are coupled to the rod 42 by levers similar to the levers 41 and are therefore caused to rotate with the torque shaft 20. These torque shafts have threaded portions cooperating with nuts linked to the outer portions 33 of the ski in precisely similar fashion, and parts associated with the torque shafts 20ª, 20ᵇ bear similar references in Figs. 5 and 6 to the corresponding parts associated with the torque shaft 20, with the addition of the suffixes a and b respectively.

It will be clear therefore that as that nuts 39, 39ª, 39ᵇ . . . on the torque shafts are moved inwardly on projection of the ski, the linkages 40, 40ª, 40ᵇ . . . will automatically move the outer portions 33 of the ski upwardly and outwardly in relation to the centre portion 32 from the position of Fig. 5 to that of Fig. 4.

On retraction of the ski the reverse action takes place, the nuts 39, 39ª, 39ᵇ . . . then being automatically moved outwardly to actuate the linkages 40, 40ª, 40ᵇ . . . to collapse the outer portions 33 of the ski against the centre portion 32.

The construction shown in Figs. 7–9 differs from that so far described in that the outer portions 33 of the ski remain closed against the centre portion 32 during projection of the ski but can be moved upwardly and outwardly, from the full-line to the chain dotted position in Fig. 8, after the ski has been projected, by means of a pair of remotely operated jacks 51 pivoted to the centre portion at 52. In this case the lower ends of the side members of the rear strut 17 are pivoted to a hinge fitting 43 on the centre portion 32 of the ski.

At spaced intervals along each outer portion 33 are provided four abutments 44, each of which is connected by a pair of links 45 to a lever 46 on a torque shaft 47. As shown in Fig. 8, the torque shafts 47 carry levers 48 connected to the actuating rods 49 of the jacks 51. Consequently, when the jacks 51 are actuated to retract the rods 49 the outer portions 33 of the ski will be moved from the full line position in Fig. 8 to the chain dotted position.

A relay system of known type is provided so that, on actuation of the pilot's control, the jacks 28 and 51 (which may be fluid-pressure operated or electrically operated) will be operated in succession, the jack 28 operating first to project the ski and the jacks 51 operating after the ski has reached the projected position to open out the outer portions 33 of the ski. The reverse sequence of operations of course takes place when the pilot's control is actuated to retract the ski.

The arrangement of Fig. 10 is similar to that of Fig. 9 except that, in this case, four pairs of jacks 151 are provided, these being pivoted at 152 to the central portion of the ski. The actuating rod 149 of each jack is connected directly to one of the levers 46 of the mechanism shown in Figs. 7 to 9, the torque shafts 47 being omitted.

What I claim as my invention and desire to secure by Letters Patent is:

1. An aircraft comprising a fuselage of substantially streamline shape, a planing section movable at will from a retracted position in which it is housed within said fuselage to a planing position in which its forward and aft ends are spaced from and below said fuselage, the aft end of said planing section when in planing position being lower than its forward end, and said planing section comprising a centre portion of approximately V-section as seen in front elevation, outer portions and hinges at the top of said planing section extending in a fore and aft direction and attaching said outer portions to said centre portion, said outer portions being normally folded against said centre portion, means for moving said planing section from its retracted to its projected position and vice versa, linkages coupling the outer portions of said planing section to the centre portion thereof and mechanism operative automatically on movement of said planing section in relation to said fuselage to actuate said linkages to swing said outer portions outwardly about said hinges during movement of the planing section to projected position and inwardly about said hinges during movement of the planing section to retracted position.

2. An aircraft comprising a fuselage of substantially streamline shape, a planing section movable at will from a retracted position in which it is housed within said fuselage to a planing position in which its forward and aft ends are spaced from and below said fuselage, the aft end of said planing section when in planing position being lower than its forward end, and said planing section comprising a centre portion of approximately V-section as seen in front elevation, outer portions and hinges at the top of said planing section extending in a fore and aft direction and attaching said outer portions to said centre portion, said outer portions being normally folded against said centre portion, means for moving said planing section from its retracted to its projected position and vice versa, linkages coupling the outer portions of said planing section to the centre portion thereof, a strut pivoted at its opposite ends to said planing surface and to said fuselage, a torque shaft at the lower end of said strut and nuts engaging oppositely threaded portions on said torque shaft, said nuts operating on movement of said planing section in relation to said fuselage to actuate said linkages to swing said outer portions outwardly about said hinges during movement of the planing section to projected position and inwardly about said hinges during movement of the planing section to retracted position.

3. An aircraft comprising a fuselage of substantially streamline shape, a planing section movable at will from a retracted position in which it is housed within said fuselage to a planing position in which its forward and aft ends are spaced from and below said fuselage, a nose piece movable from a retracted position, in which it is housed within the fuselage, to an operative position and pivoted at its forward end to said fuselage and at its aft end to said planing section, the aft end of said planing section when in planing position being lower than its forward end, and said planing section comprising a centre portion of approximately V-section as seen in front elevation, outer portions and hinges at the top of said planing section extending in a fore and aft direction and attaching said outer portions to said centre portion, longitudinally spaced struts pivoted at their opposite ends to the fuselage and to the planing section, a remotely operable jack for imparting pivotal movement to said struts to move the planing surface to and from its planing position, the forward strut serving, when actuated, also to move said nose piece to and from operative position, a torque shaft at the lower end of the rear strut, linkages for moving said outer portions about said hinges, and an operative connection between said torque shaft and said linkages for operating said linkages to spread the outer portions as the planing section descends to projected position and for folding said outer portions against said centre portion as the planing section is raised to retracted position.

References Cited in the file of this patent

UNITED STATES PATENTS

| | | |
|---|---|---|
| 1,166,488 | Smith | Jan. 4, 1916 |
| 2,320,574 | Dornier | June 1, 1943 |
| 2,347,841 | Parker | May 2, 1944 |
| 2,574,404 | Levy | Nov. 6, 1951 |